United States Patent Office 3,379,028
Patented Apr. 23, 1968

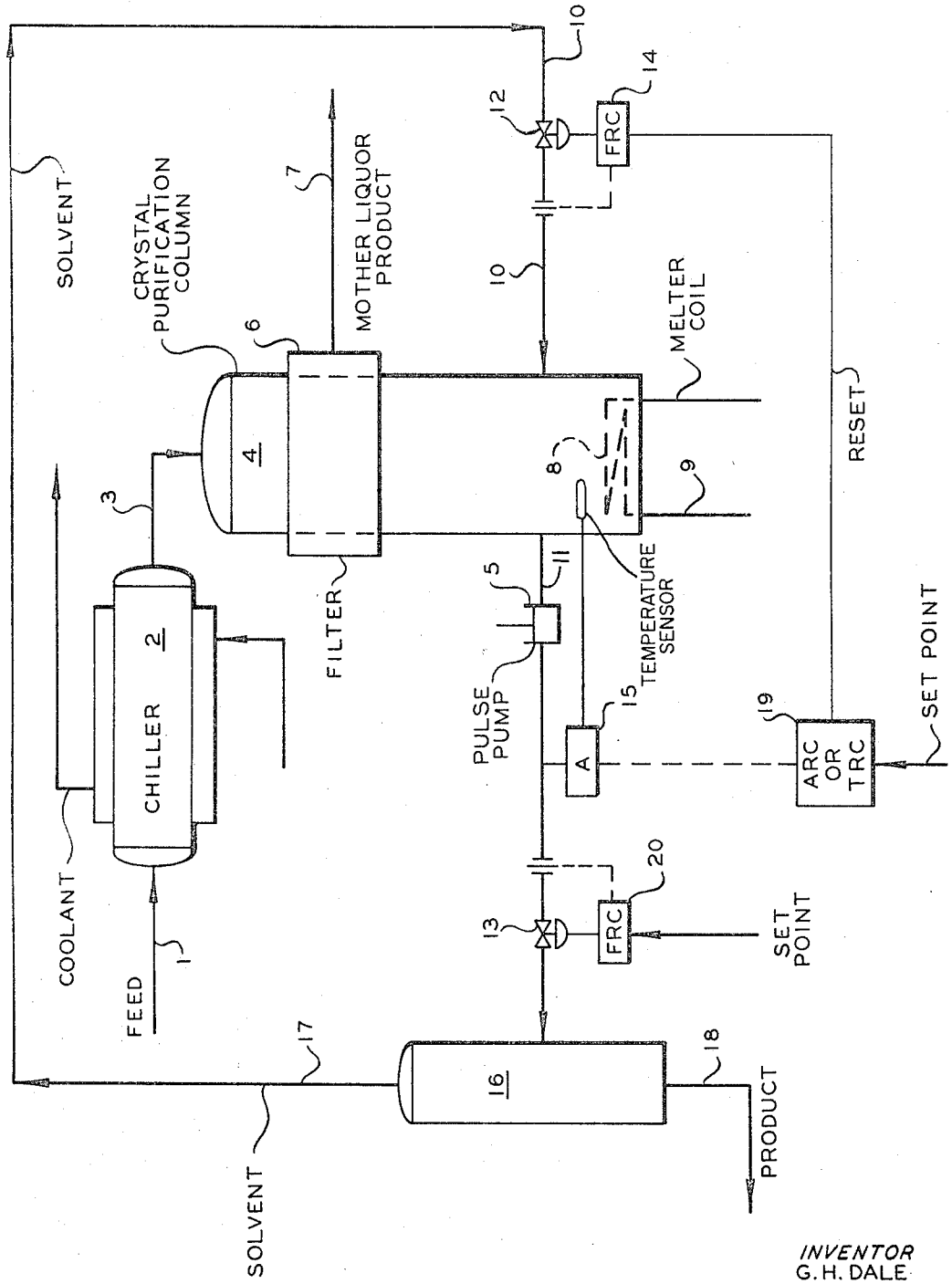

1

3,379,028
MELTING A CRYSTALLINE FRACTION IN
A SOLVENT PRESENCE
Glenn H. Dale, Bartlesville, Okla., assignor to Phillips
Petroleum Company, a corporation of Delaware
Filed Apr. 4, 1966, Ser. No. 539,833
7 Claims. (Cl. 62—58)

This invention relates to the purification of materials. In one of its aspects, it relates to a process for purifying a high melting point or sublimable or heat decomposable material comprising passing a mixture containing said material to a chiller to form a crystal mass in which the high melting or sublimable or heat decomposable material is the higher melting point constituent, passing the crystal mass to a purification zone wherein non-crystallized, low melting point components are withdrawn from the purification zone, and passing purified crystals to a melting zone in which crystals are melted in the presence of a solvent, controlling the rate of addition of solvent to the melting zone in response to an analysis or the temperature of the mixture of solvent and crystal melt removed from the melting zone. In another of its aspects, the invention relates to a process for purifying a high melting point or sublimable or heat decomposable material as hereinbefore described wherein the temperature in the melt zone is maintained below the melting point or sublimation or decomposition temperature of the material being purified. In a still further aspect, the invention relates to a process as hereinbefore described wherein the purification zone is maintained under conditions such that less than about 40 percent crystal refreezing occurs.

The invention also relates to an apparatus for purification of a sublimable material comprising a chiller, a purification means for melting and refreezing crystals, a melting means for melting purified crystals, means for passing a crystal mass from the chiller to the purification means, means for passing purified crystals from the purification means to the melting means, means to supply solvent to the melting means, means to remove solvent with purified material from the locus of the melting means, means to control the ratio of solvent to purified material withdrawn responsive to the temperature or to an analysis of the material withdrawn from the melting zone.

Pharmaceutical materials, t-phthalic acid and other high-melting materials are difficult to purify by crystallization because they cannot be melted. If melting occurs, the materials will sublime and/or decompose. Thus, the purification method for such materials requires that the pure substance not be heated above the decomposition or sublimation point.

I have now discovered that such materials can be purified in a fractional crystallization process and apparatus in which solvent is supplied to the melting zone to dissolve the purified material before it melts.

Separation of multi-component mixtures by fractional crystallization is well known. Generally, the mixture, usually a mixture of liquids, is introduced into a chilling zone which partially crystallizes the mixture and the resulting crystal slurry is passed to a purification zone for removal of the non-crystallized liquid. In the purification zone, the higher melting point constituents remain crystallized. In the purification zone, the lower melting point constituent is removed as mother liquor, and the higher melting point constituent is removed as solid crystals. The higher melting point constituent, being separated from the lower melting point constituent, is passed to a melting zone in which heat is supplied to the crystals to melt them. A portion of the melted material is passed countercurrent to the purified crystal flow to wash and further purify the crystals of the non-crystallized mother liquor.

2

Some of the crystal melt refreezes during the countercurrent treatment and this assists in the purification of the crystals. The amount of refreezing, in fact, largely determines the final purity of the crystal melt. It is important, therefore, to be able to control the amount of refreezing. I have found that I can control the refreezing ratio by manipulating the temperature of the crystal melt since refreezing is a direct function of the difference between the temperature of the unpurified crystals in the purification zone and the temperature of the crystal melt.

U.S. 2,813,099 describes and claims a process for purifying crystals wherein solvent is introduced into the melting zone of the purification zone in order to lower the viscosity and density of the liquid phase. Low boiling solvent is utilized to aid the natural reflux in removing occluded impurities from the crystals and the solvent is supplied to the purification zone at a temperature sufficiently high to dissolve at least a portion of the crystals.

I have now discovered that in a process wherein solvent is supplied to the crystal melting zone in a fractional crystallization process, the rate of addition of the solvent can be manipulated in response to an analysis or to the temperature of the mixture of solvent and purified material withdrawn from the melting zone. The melting zone temperature or analysis is controlled by adjusting the rate of solvent feed to the melting zone.

By various aspects of this invention, one or more of the following or other objects can be obtained.

It is an object of this invention to provide a process and apparatus for purifying a high-melting point material by fractional crystallization.

It is another object of this invention to provide a process and apparatus for purifying a sublimable and/or heat decomposable material by fractional crystallization.

It is a further object of this invention to provide a process and apparatus for controlling the temperature in a crystal purification column by solvent addition to the column.

Other aspects, objects and the several advantages of this invention are apparent to one skilled in the art from a study of this disclosure, the drawing and the appended claims.

According to the invention, a high melting point or sublimable and/or heat decomposable material is purified by passing the impure material to a chiller to form a slurry of crystals, passing the crystal slurry to a purification zone in which impurities are removed, passing purified crystals to a melting zone in which crystals are melted and/or dissolved in the presence of solvent. The solvent dissolves the crystals at a reduced temperature and prevents the crystals from subliming or decomposing upon melting. The solution of purified material and solvent is passed from the column and the purified material is recovered from the solvent as needed. According to one embodiment of the invention, the flow of solvent to the melting zone is manipulated relative to an analysis of the material removed from the melting zone. The rate of solvent addition may also be manipulated according to the temperature in the melting zone.

Materials which can be purified according to this invention include t-phthalic acid, coumaric acid, the esters and other derivatives of the phthalic acid isomers, inorganic compounds such as Glauber's salt (Na$_2$SO$_4$·10H$_2$O)

silver fluorides, sodium benzene sulfonate, ammonium carbonate, Biuret, sodium acetamide, α-aminoisobutyric acid, trimesitic acid, anthraquinone, anthracenediol, azoformamide, chloronitrobenzene, benzilic acid, vitamin B–1, L-methionine, trimellitic acid, glutamic acid, etc.

Solvents which can be used according to the invention to purify the above materials include water, alcohols such as methanol, ethanol, propanol, glycols; ketones such as acetone, methyl ethyl ketone, etc.; ethers such as ethylene glycol mono-alkyl ethers, dioxane, etc.; hydrocarbons such as propane, butane, pentane, etc.; aromatics such as benzene, toluene, xylene, etc.; naphthenes such as cyclohexane, methylcyclohexane, etc.; amines such as ammonia, methylamine, etc.; sulfolane and the alkyl sulfolanes, etc.

Further, according to the invention, there is provided an apparatus for purifying the sublimable and/or heat decomposable materials. The apparatus comprises a chiller, a purification column in which a crystal mass is at least partially melted and mother liquor removed, a melting means at one end of the column to melt purified crystals, means to supply solvent to the melting end of the column, means to withdraw solvent and purified material from the melting end of the column, and means to control the temperature in the melting end of the column by adjusting the rate of solvent addition.

The invention will now be described with reference to the drawing which shows an embodiment of the invention.

Referring now to the drawing, an impure mixture of materials containing a sublimable and/or heat decomposable material is fed to chiller 2 in which is formed a slurry of crystals of the sublimable and/or heat decomposable material. The crystal slurry is passed through line 3 to purification column 4 in which the non-crystallized lower melting point components in the crystal slurry is removed through line 7. In purification zone 6, the crystals are contacted countercurrently with some of the liquid from melt zone 8 below thereby purifying the crystals of residual non-crystallized components. Purified crystals passes down into zone 8, wherein heat is supplied to melt the crystals. Heat is at least in part supplied by heater means 9. A solvent is introduced into zone 8 through line 10. The solvent and heat dissolve the crystals at a temperature below the decomposition temperature. The solvent should be present in zone 8 in such an amount that the product stream leaving zone 8 in line 11 has the desired composition or temperature. This in turn determines the amount of refreezing of the material passing upward, countercurrent to the crystals. In a preferred embodiment of the invention, a pulsing means 5 is provided in line 11 to aid in the purification process as described and claimed in Thomas 2,854,494. Solvent containing the purified material is removed through line 11, passes through valve 13 and to purification zone 16 in which solvent removed through line 17 is separated from pure crystal melt removed in line 18.

According to the invention, the amount of solvent supplied to the column through line 10, passing through valve 12, is controlled according to the temperature sensed by thermocouple or analyzer 15 in the end zone 8 or product line 11. Flow rate controller 14 controls valve 12 in response to the analysis or temperature measurement through the reset action of controller 19. Flow rate of product through line 11 is fixed by controller 20 and valve 13. Heat input to melter coil 9 is also fixed by conventional means. In operation, then, a desired composition or temperature set point is applied to controller 19, say a composition of 50 percent solvent. Controller 19 then resets controller 14 which adjusts flow of solvent by valve 12 until analyzer 15 measures 50 percent solvent in line 11. Temperature in melt zone 8 is thus fixed for the mixture in said zone at a value below the melting point of the high-melting component.

It has been found that for optimum results, the refreezing of crystals in the column must be limited to about 40 percent. The amount of refreezing of the crystals is controlled by controlling the temperature in the melt zone 8. In the event that the temperature in melt zone 8 increases, the thermocouple 15 will send a signal to controller 19 which will reset controller 14 so that more solvent will be fed to the column. In the event that the temperature in melt zone 8 is too low, then the opposite will occur.

The invention is illustrated by the following specific example wherein impure caprolactam is purified with and without the addition of cyclohexane solvent. The stream numbers refer to those in the figure.

|  |  |  | Without Solvent | With Solvent |
|---|---|---|---|---|
| Stream No | 1 | 3 | 11 | 11 |
| Caprolactam Purity, wt. percent | 80 | 80 | 99 | [1] 99 |
| Temperature, °F | 140 | 90 | 210 | 182 |
| Initial Freezing Point of System, °F | 122 | 122 | 157 | 132 |
| Cyclohexane, wt. percent | 0 | 0 | 0 | 20 |
| Refreezing Ratio, lb. reflux frozen per pound impure crystals |  |  | 0.43 | 0.34 |

[1] On solvent-free basis.

The above data indicate the improvement obtained by adding cyclohexane to the base of the column and thus lowering the reflux temperature from 210° F. to 182° F., thereby avoiding decomposition of the caprolactam. This lowering of the reflux temperature also reduces the amount of refreezing in the purification section of the column from 0.43 to 0.34 pound of reflux frozen per pound of impure crystals. Operation of the purification is more stable at the lower value, thereby permitting operation at higher throughputs.

Reasonable variation and modification are possible within the scope of the foregoing disclosure, the drawing and the claims to the invention, the essence of which is that a sublimable and/or heat decomposable material is purified in a fractional crystallization column wherein solvent is supplied to the melt zone, the rate of product withdrawal is controlled relative to the solvent feed to the melt zone in accordance with the temperature in the melt zone.

I claim:

1. A process for purifying a high melting point or sublimable or heat decomposable material comprising passing said material to a chiller to form a crystal slurry, passing said crystal slurry to a purification zone where non-crystallized impurities are removed, passing crystals through a purification zone, passing purified crystals to a melting zone in which crystals are melted at least in part by a heater in the presence of solvent, passing melt and solvent countercurrent to crystal flow to said purification zone, passing solvent to said melting zone, removing solvent and purified material from said melting zone, controlling the solvent feed to said melting zone responsive to a condition selected from a group consisting of temperature in said melting zone and composition measurement of a mixture of solvent and purified material removed from the melt zone.

2. A process according to claim 1 wherein the temperature of said melt zone is maintained below the melting point of said material.

3. A process according to claim 1 wherein the conditions in said purification zone are such that the amount of crystal refreezing is less than 40 percent.

4. An apparatus for purifying high melting point or crystallizable or heat decomposable material comprising a chiller adapted to form a crystal mass from a feed containing said material, a purification column comprising a purification section of said column and a melting section of said column, means to pass the crystal mass formed in said chiller from said chiller to said purification section of said column, heater means for melting crystals in said melting section of said column, means for removing mother liquor from said purification section of said column, means for passing liquid countercurrent to said crystal flow from said purification section to said melting section of said column, means to pass solvent to said melting section of said column, means for removing solvent and said purified material from said melting section of said column, and means to control the rate of solvent flow to said melting section responsive to a condition selected from the group consisting of temperature in said melting section of said column and composite measurement of a mixture of solvent and purified material removed from the melt zone.

5. An apparatus according to claim 4 wherein a first controller in response to the said condition resets a second controller which adjusts a valve for passing solvent to said column.

6. An apparatus according to claim 5 wherein there is further provided a means for pulsing said column to provide a pulsating current to said column.

7. A process according to claim 1 wherein the ratio of solvent withdrawal from said melting zone to solvent feed to said melting zone is controlled responsive to the temperature in said melting zone.

References Cited
UNITED STATES PATENTS

| | | | |
|---|---|---|---|
| 2,813,099 | 11/1947 | Weedman. | |
| 2,882,215 | 4/1959 | Dale. | |
| 3,150,500 | 9/1964 | Goard | 62—58 X |
| 3,259,181 | 7/1966 | Ashley | 62—58 X |
| 3,285,025 | 11/1966 | Shaul | 62—58 |

NORMAN YUDKOFF, *Primary Examiner*.